United States Patent [19]

Ladstädter

[11] 4,009,364
[45] Feb. 22, 1977

[54] CURING OF PROTECTIVE COATINGS WITH IRASER BEAMS
[75] Inventor: Elmar Ladstädter, Graz, Austria
[73] Assignee: Vianova-Kunstharz, A.G., Vienna, Austria
[22] Filed: Mar. 21, 1974
[21] Appl. No.: 453,561
[30] Foreign Application Priority Data
  Mar. 28, 1973  Austria .............. 2700/73
[52] U.S. Cl. ...................... 219/121 L; 427/53; 427/55
[51] Int. Cl.² ...................... B23K 27/00
[58] Field of Search ............ 219/121 EB, 121 EM, 219/121 L, 121 LM; 117/93.3, 93.31, 119.2, 119.6; 118/620, 641, 642, 643, 4, 5; 427/53, 55

[56] References Cited
UNITED STATES PATENTS

| 3,154,371 | 10/1964 | Johnson | 219/121 L X |
| 3,364,087 | 1/1968 | Solomon et al. | 118/641 X |
| 3,387,109 | 6/1968 | Bruma et al. | 219/121 L X |
| 3,476,170 | 11/1969 | Christian et al. | 219/121 LM X |
| 3,485,996 | 12/1969 | Chiou et al. | 219/121 LM |
| 3,569,993 | 3/1971 | Blin et al. | 219/121 L |
| 3,594,532 | 7/1971 | Lunau et al. | 219/121 L |
| 3,700,850 | 10/1972 | Lumley et al. | 219/121 LM |
| 3,743,777 | 7/1973 | Hanus | 219/121 LM |

FOREIGN PATENTS OR APPLICATIONS 2,002,529  9/1970  Germany .............. 118/5

Primary Examiner—J. V. Truhe
Assistant Examiner—G. R. Peterson
Attorney, Agent, or Firm—A. W. Breiner

[57] ABSTRACT

A method and arrangement for curing paint films and coating compositions by means of infrared radiation emitted by IRASERS, whereby the intensity of the IRASER beam is determined or controlled by the simultaneous measurement of the surface temperature of the coating being cured, and programs therefor, are described. Uniformity of cure of the paint films and coating compositions is obtained.

10 Claims, 4 Drawing Figures

CURING OF PROTECTIVE COATINGS WITH IRASER BEAMS

FIELD OF INVENTION AND BACKGROUND

The invention is concerned with an arrangement for curing paint films and coating compositions with the aid of infrared radiation emitted by IRASERS (Infra Red Amplification by Stimulated Emission of Radiation) and a suitable control system to keep constant the surface temperature of the coating being cured and to control the curing process according to a selected temperature-time schedule.

U.S. Pat. No. 3,743,777 to Hanus et al describes the process of curing paint films and coatings by infrared radiation emitted by a laser (IRASER). It is a problem in such processes, however, to control the beam with regard to its position and/or intensity in order that the surface is irradiated uniformly with the energy required for curing the coating.

SUMMARY OF INVENTION

It has now been found that the aforesaid difficulties can be overcome by an arrangement whereby the surface to be cured is scanned with the IRASER beam according to a select program and the irradiation is controlled by a simultaneous measurement of the surface temperature of the coating being cured. Accordingly, the invention is primarily concerned with an arrangement for curing paint films and coatings by means of infrared radiation emitted by IRASERS whereby the intensity of the beam of the IRASERS directed to the paint surface is set through the simultaneous measurement of the surface temperature of the film or coating being cured.

DRAWING AND DETAILED DESCRIPTION

The invention will be more particularly described with reference to the drawing wherein.

Figure 1:
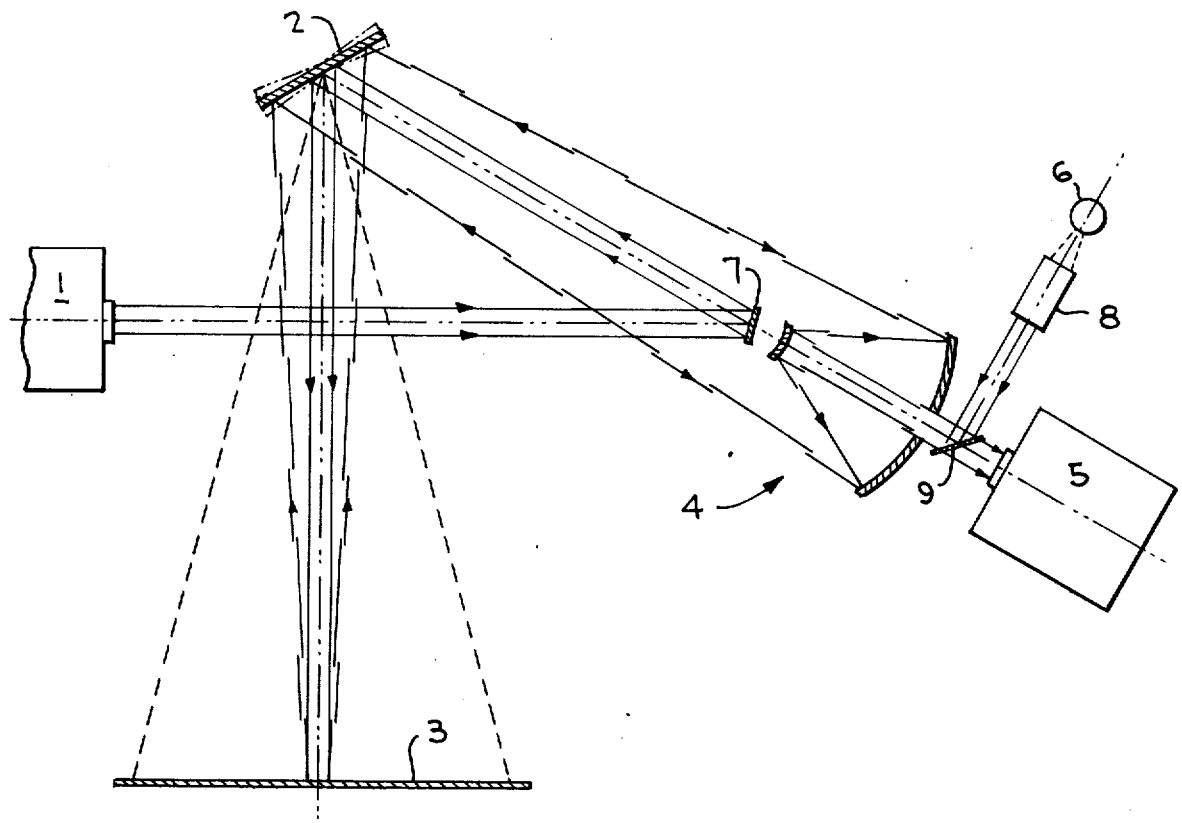
FIG. 1 is a diagrammatic view of a curing arrangement according to the present invention.

Referring first to FIG. 1, the invention is primarily concerned with an arrangement for curing paint films and coatings by means of infrared radiation emitted by IRASERS, the arrangement being characterized in that the beam of the IRASER 1 is directed on the paint surface 3 to be cured via a fixed mirror 7 and a moving mirror 2, the latter being movable round two axes rectangular to each other, whereby a portion of the temperature radiation emitted by the heated paint surface is projected to telescope 4 and infrared thermometer 5 via the moving mirror 2. The surface temperature reading of the paint 3, obtained with the IR-thermometer 5, is used according to the arrangement of the invention to control, or keep constant, or to adjust the surface temperature of the coating according to a suitable temperature-time schedule by modulating the intensity of the IRASER beam.

Moreover, according to the invention, the light of lamp 6 is brought into the beam of the infrared thermometer 5 via the condensor 8 and ring-shaped mirror 9, thereby, after passing the telescope 4 and reflection at the moving mirror 2, the circumference of that part of the surface 3 is made visible, which is simultaneously covered by the IRASER beam 1 and the measuring aperture of the infrared thermometer 5. The arrangement of the invention permits, therefore, the measurement of the temperature of the paint film at the very place the IRASER beam is heating and curing.

The IRASER beam is scanned over the paint film 3 by deflecting the moving mirror such that any point of the paint film receives the energy necessary for the complete curing of the film. The surface of paint film may have any dimensions. For regular shapes, the IRASER beam is preferably scanned in lines. The distance between the lines is chosen according to the diameter of the IRASER beam and the heat conductivity of the paint film such that neighboring traces of the beam are covered by 20 – 80 percent of the beam diameter. The diameter and the intensity of the IRASER beam can be adjusted in known manner by optical means (lenses, mirrors).

It is a special feature of the described arrangement that, in contradistinction to an enlargement of the IRASER beam diameter by mere optical broadening, the usually non-uniform transversal mode pattern is not projected onto the paint surface, guaranteeing a locally uniform heating. Furthermore, with the aid of the scheduled deflection via a mirror, the surface elements heated by the IRASER beam can be circumscribed precisely and the heating is effected according to a temperature program which is the most adequate for the coating composition employed which, in turn, guarantees excellent curing results and an essential reduction in time in comparison to conventional methods.

The following describes the various elements of the arrangement of the invention.

1. Temperature Control

One, and a preferred arrangement of the invention is that whereby the final temperature at one part of the irradiated surface depends on the applied energy and, thus, on the time during which the IRASER beam is directed onto this part. Thus, by varying the irradiation time per surface unit, practically any maximum temperature can be obtained. This is possible in cases where the irradiated material has low heat conductivity, building high temperature gradients for short periods, and if the substrate has a higher heat capacity than the coating. Both conditions are generally valid in the case of the curing of synthetic resin paints.

The measuring signal of the IR-thermometer is converted by the aid of a linearizing amplifier to a voltage proportional to the surface temperature of the aimed at area and is compared in known manner in a control-amplifier with the nominal value given by a temperature programmer. The amplified voltage difference causes a change in the frequency of an oscillator and, thus, of the velocity of the scanning program such that when the actual temperature is too low, the laser beam will linger on the pertinent area until the nominal value is reached; then it passes on to the next surface unit.

This method is particularly characterized in that (a) the radiation source can work continuously; (b) the total available energy is conveyed to the irradiated object, and (c), due to the analog mode of control, for each surface unit a continuous energy supply is guaranteed.

In case an effective temperature control by modulating the scanning speed is not possible, a further possibility is provided by designing the control device as external optical amplitude modulator, varying its permeability for the IRASER radiation in dependency on the amplified differential signal of the control amplifier. Designs of external modulators are known in laser technique. See, for example, Kleen/Müller, Laser, page 423 f., Springer 1969.

Furthermore, it is also possible to use one of the known internal modulation methods. In this case, a parameter (see Kleen/Müller, Laser, page 442 f., Springer 1969) which is responsible for the production of oscillation in the IRASER is influenced. Thereby the scanning speed is held constant at that value which enables one to obtain the maximum temperature of the program at full power of the IRASER for every surface unit.

Another variation of the invention uses an external digital optical switch by which a continuous series of irradiation pulses of various duration is created. The average output power of the IRASER 1 can, thus, be changed from zero to the maximum. The carrier frequency of this pulse-modulation must be sufficiently high, least detrimental temperature peaks are caused in the coating by the discontinuous energy supply, and in order to still guarantee a control during the scanning of the various surface elements.

The mentioned switches may either be mechanical switches or external modulators working as switches. An arrangement for the production of control signals for the optical switch can consist of an integrator which, controlled by a comparator, alternatively receives via an electronic switch the output voltage of the control amplifier shifted by a constant voltage in positive or negative direction. This causes, depending on the amount and sign of the difference between nominal and actual value of temperature, a periodically prolonged "closed"-time of the switch and an accordingly reduced "open"-time or vice versa, with the basic frequency remaining constant.

In place of the external switch, an internal modulator in the resonator of the IRASER can be used as the switch in known manner. In the case of the frequently used stimulation of IRASERS by electric gas discharge, the discharge current and, thus, the originating of oscillation is interrupted periodically.

2. Temperature Programmer Unit

In order to make full use of the curing of organic coatings by IRASERS, the temperature of the paint surface must be controlled, the nominal value of the temperature usually changing with time. Solvent release, coalescing of the coating to an even, smooth film and cross-linking reaction are taking place at different temperatures and take different periods of time. Furthermore, the most favorable temperature schedule depends upon the solvent and binders used.

Figure 2:
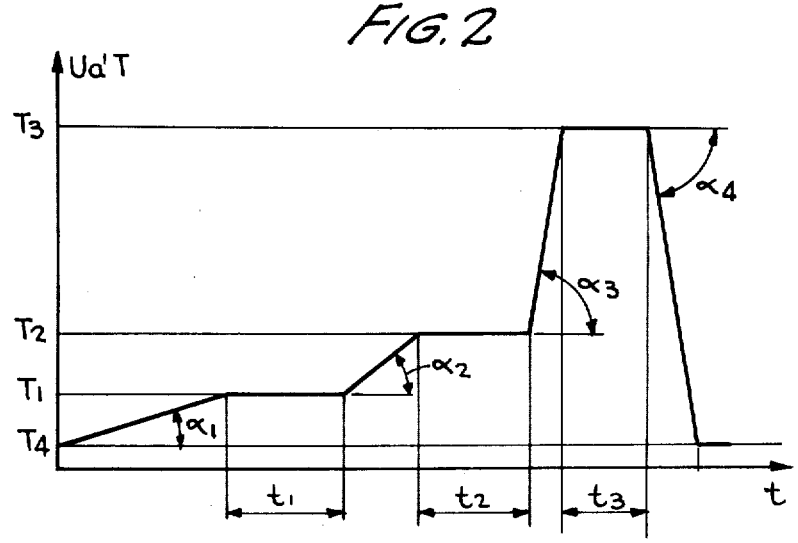
FIG. 2 illustrates a time-temperature curing program according to the present invention.

A suitable temperature programmer for use in the claimed curing arrangement consist of a number of current sources and timing circuits, the connection of which to a charging capacitor can have, for example, the voltage diagram illustrated in FIG. 2 for four current sources and three timing circuits. This voltage corresponds to the temperature proportional voltage supplied by the temperature measuring device 5 and the linearizing amplifier and, thus, the two can be compared directly at the control amplifier.

The rise time of the temperature proportional voltage (the speed of the change in voltage) is determined by the capacity of the charging capacitor and by the current supplied by the current source in action. After reaching the predeterminable voltage level, the current source is switched off and the unit of the programmer responsible for the next curve section is switched on. In FIG. 2 it is a timer, i.e., the selected voltage (and, thus, the selected temperature) remains constant for a preselectable period of time. Upon termination of this period, the next rise in voltage in the example starts, and so on. In the case of periodic operation, the voltage attained at the end determines the starting point as well.

In FIG. 2 there is an alternate sequence of time-linear voltage changes (designated by $\alpha = dT/dt$) and timer circuits (designated by $t$). It is evident that any sequence of components (voltage rise, fall, timer circuits) is possible and that the number of elements can be increased arbitrarily. Thus, practically any time-dependent voltage sequence ( = temperature sequence) can be effected by a polygonal course.

Figure 2A:
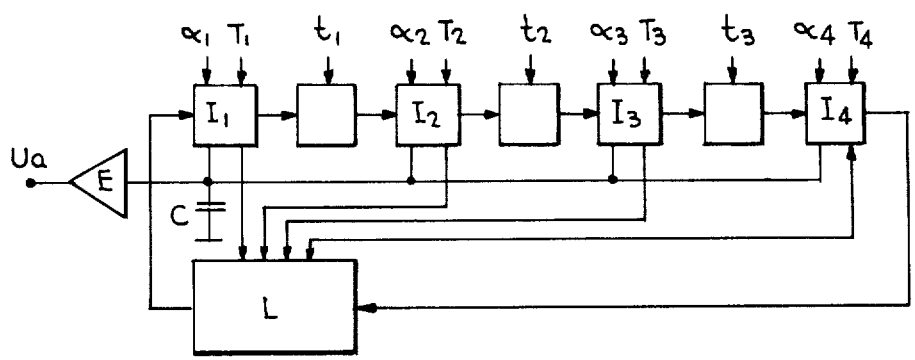
FIG. 2a illustrates schematically the elements required for the program of FIG. 2.

FIG. 2a shows the elements required for the program. $I_1 - I_4$ are switchable current sources, the parameters $\alpha$ (speed of voltage change) and T (final voltage) can be adjusted; $t_1 - t_3$ are the periods selectable at the timer circuits for constant voltage; the control logic is supervising the program and permits single shot or periodic operation, the electrometer amplifier E prevents a discharge of the storage capacitor (C) at the load of voltage $U_a$.

Essential features of the programmer unit are the free choice of all parameters, the possibility of introducing an arbitrary number of elements, the choice of approximating any time-dependent voltage diagram by means of a polygonal course, thereby time-linear voltage rises and falls are created by means of switching constant current sources, which charge or discharge a capacitor and whereby intervals of constant voltage across the capacitor are created by timers.

3. Control of Beam Scanning

For irradiating larger areas with the concentrated beam of an IRASER, the beam must be deviated. In the arrangement of the invention this is done by two-dimensional deviation of the beam with the aid of a mirror according to a freely selectable and at any time reproducible pattern containing the shape of the surface as well as the mentioned conditions for obtaining uniform curing results.

The preferred arrangement for the claimed invention of digital electronic storage of the scanning program and the electronic driving means for the scanning mirror, which can be constructed analog or digital, is equal for both axes.

Figure 3:
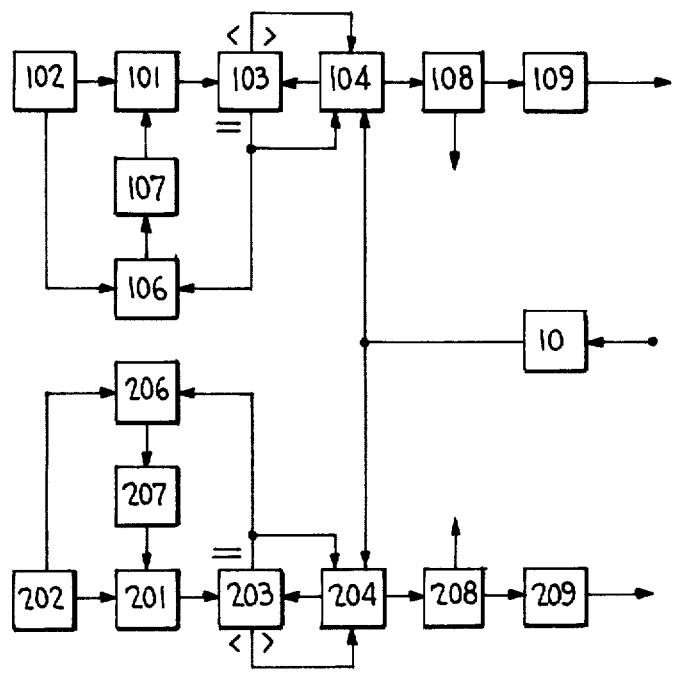
FIG. 3 illustrates the scheduling of the movement around the axes of the scanning mirror.

FIG. 3 shows the possibility of scheduling the movement round both axes of the scanning mirror. To the intermediate digital memory (RAM, random access memory) 101, 201, local coordinates are transferred via the input 102, 202 in the sequence determined by the address counter 106, 206 and the address decoder 107, 207. If the desired scanning program in form of the local coordinates to be covered in their sequence by the IRASER beam is read into the intermediate memory 101, 201, the program can be executed at any time. Thereby, the digital comparator 103, 203 compares the coordinate at the memory output with the state of the coordinate counter 104, 204. If there is a difference, the counter 104, 204 counts forward or backward at the rate of the scanning speed the oscillator 13 is adjusted to, until the comparator 103, 203 shows equality. In this case the counter 104, 204 is stopped and at the same time the next coordinate word is fetched from the memory 101, 201, the counter 106, 206 and with it the memory address 107, 207 moves forward by one unit.

The instant state of the coordinate counter 104, 204 determines the state of the mirror drive 108, 208 and, thus, the position of the scanning mirror (2 on FIG. 1). Preferably, the mirror drive is effected by a polyphase stepping motor. In this case the counter 104, 204, after adequate coding, can directly control the operating condition of the motor coils. If analog positioning equipment (DC-servo drives) is used, digital/analog converters 109, 209 can be connected in known manner.

It is an essential feature of the scanning program of the invention that the programs are highly variable and require a minimum memory capacity. Since the coordinate counter 104, 204 is counting automatically with predetermined speed until the coordinate given by the memory is reached, only the significant points of the scanning program, like turns and halts of the two overlapping scanning movements, have to be recorded. The scanning speed can be modified with the aid of an oscillator 10. The data can be read from punched tape, punched cards, magnetic tape, or other known unit records, or provided by hand. The use of intermediate memories allows the modification of the program in simple manner without destroying the original program.

The method and arrangement according to the present invention can be carried out with the various paint films and coating compositions which exist in the unhardened state, but which are capable of hardening to a thermoset state when exposed to infrared radiation. These coatings are of the type defined, for example, in the aforesaid U.S. Pat. No. 3,743,777. Paint films and coating compositions, in addition to those defined in the aforesaid patent, are known to those skilled in the art. Moreover, the IRASER source and the intensity of the beam is known to those skilled in the art, with the IRASER source defined in the aforesaid U.S. Pat. No. 3,743,777 being typical. The IRASER source and the intensity of the beam will be selected in part through consideration of the composition being treated and upon economic considerations. It should be appreciated that the present invention is not to be construed as being limited by the aforesaid description, it being possible to produce still other embodiments without departing from the inventive concept herein disclosed. Such embodiments being within the ability of one skilled in the art are covered herein, the scope of the invention being defined by the appended claims.

It is claimed:

1. System for curing protective coating compositions over a large area with infrared radiation emitted by IRASERS comprising
   — a composition to be cured;
   — an IRASER source;
   — fixed mirror means for receiving IRASER beams from said IRASER source;
   — movable mirror means movable around two axes so constructed, arranged, and positioned with respect to said fixed mirror means and said composition so as to simultaneously receive IRASER beams reflected from said fixed mirror means; direct received IRASER beams to said composition to be cured in a scanning pattern; simultaneously receive heat rays from said composition and direct said received heat rays to temperature-responsive means, and
   — temperature-responsive means for receiving and measuring the temperature of heat rays so constructed, arranged, and positioned with respect to said movable mirror means to receive said heat rays from said movable mirror means, said system providing uniform curing of said protective coating over a large area.

2. The system according to claim 1 including means associated with said temperature-reponsive means to control the surface temperature of said composition to be cured.

3. The system according to claim 2 including means for the modulation of the IRASER beam intensity in cooperation with and controlled by the temperature-responsive means to control the temperature of said composition.

4. The system of claim 3 further including a light source, a condensor, and a ring-shaped mirror so constructed, arranged, and positioned whereby light from said light source is directed into the beam of the infrared radiation measuring device and after reflection at the moving mirror is directed to the composition being cured, making visible that portion which is covered by the IRASER beam.

5. The system according to claim 4 including means for varying the temperature at the surface of said composition according to a preselected temperature-time schedule.

6. The system according to claim 2 including means for obtaining a select temperature at the surface of said composition by variation of the exposure time of said surface to the IRASER beam.

7. The system according to claim 3 wherein said means for the modulation of said IRASER beam includes an optical amplitude modulator whereby the variation in intensity of the beam with time is continuous or digital in the form of a pulse-width modulation.

8. The system according to claim 3 wherein said means for the modulation of said IRASER beam includes an internal modulator for controlling the generation of oscillation in the IRASER, the variation of intensity of the IRASER beam with time being continuous or digital in the form of a pulse-width modulation.

9. The system according to claim 5 wherein said means for varying said temperature according to the preselected temperature-time schedule includes means for programming on a temperature proportional time-dependent voltage, the time-linear voltage rise and falls thereby being controlled by switchable and adjustable constant current sources charging and discharging a capacitor, and by intervals of constant voltage being effected by adjustable timer circuits.

10. The system according to claim 3 including means for programming the movements of the moving mirror round its two axes and means for storing the halting and turning points of a scanning program as digital coordinates, executed by mirror drive means in the sequence of the data input at any time, the steps from one coordinate to the next being covered by the shortest distance at a preselected speed.

* * * * *